(12) United States Patent
Takayanagi et al.

(10) Patent No.: US 6,294,611 B1
(45) Date of Patent: Sep. 25, 2001

(54) OLEFIN THERMOPLASTIC ELASTOMER COMPOSITION AND PROCESS FOR PRODUCING THE SAME

(75) Inventors: Kenjiro Takayanagi; Tatsumi Tsuji; Shigeo Mizukami, all of Yokkaichi; Shiroh Gotoh, Kurashiki, all of (JP)

(73) Assignee: Mitsubishi Chemical Corporation, Tokyo-to (JP)

( * ) Notice: Subject to any disclaimer, the term of this patent is extended or adjusted under 35 U.S.C. 154(b) by 0 days.

(21) Appl. No.: 09/415,911

(22) Filed: Oct. 12, 1999

(30) Foreign Application Priority Data

| Oct. 16, 1998 | (JP) | 10-294798 |
| Dec. 10, 1998 | (JP) | 10-351121 |
| Sep. 1, 1999 | (JP) | 11-246967 |

(51) Int. Cl.$^7$ .......................... C08L 23/00; C08L 23/04; C08L 45/00
(52) U.S. Cl. ....................... 525/191; 525/216; 525/240
(58) Field of Search .................... 525/191, 216, 525/240

(56) References Cited

U.S. PATENT DOCUMENTS

| 5,077,327 | 12/1991 | Cecchin et al. . |
| 5,286,564 | 2/1994 | Cecchin et al. . |
| 5,302,454 | 4/1994 | Cecchin et al. . |
| 5,326,639 | 7/1994 | Leonard et al. . |
| 5,948,867 | * 9/1999 | Abhau ................................ 525/194 |

FOREIGN PATENT DOCUMENTS

| 0 400 333 | 12/1990 | (EP) . |
| 0 844 278 | 5/1998 | (EP) . |
| 55-80418 | 6/1980 | (JP) . |
| 57-10611 | 1/1982 | (JP) . |
| 61-95017 | 5/1986 | (JP) . |
| 3-97747 | 4/1991 | (JP) . |
| 3-205439 | 9/1991 | (JP) . |
| 3-220251 | 9/1991 | (JP) . |
| 6-25367 | 2/1994 | (JP) . |
| 8-100037 | 4/1996 | (JP) . |
| 9-104729 | 4/1997 | (JP) . |

* cited by examiner

*Primary Examiner*—Nathan M. Nutter
(74) *Attorney, Agent, or Firm*—Oblon, Spivak, McClelland, Maier & Neustadt, P.C.

(57) ABSTRACT

There is provided an olefin thermoplastic elastomer composition comprising the following components (A) and (B), said composition having been produced by first polymerizing a monomer of the component (A) and then polymerizing monomers of the component (B), said composition having such fractionation properties that, in temperature rising elution fractionation in the temperature range of 0 to 140° C. using o-dichlorobenzene as a solvent, the eluate obtained at 0° C. is 35 to 60% by weight based on the total elution weight and the eluate obtained at 80 to 100° C. is 1 to 5% by weight based on the total elution weight:

(A) 30 to 60% by weight, based on the whole composition, of a propylene homopolymer component having an isotactic index of not less than 90%; and (B) 40 to 70% by weight, based on the whole composition, of a copolymer of propylene with other α-olefin having 2 to 8 carbon atoms, said copolymer comprising propylene and ethylene as indispensable components.

7 Claims, No Drawings

OLEFIN THERMOPLASTIC ELASTOMER COMPOSITION AND PROCESS FOR PRODUCING THE SAME

TECHNICAL FIELD

The present invention relates to an olefin thermoplastic elastomer composition which has excellent balance among softness, tensile properties and low-temperature impact resistance and, at the same time, has excellent heat resistance, and a process for producing the same.

BACKGROUND ART

In recent years, thermoplastic elastomers, such as styrene, olefin, polyester, polyamide, and polyurethane thermoplastic elastomers, which are rubbery soft materials, require no vulcanization step, and have the same moldability as thermoplastic resins, have drawn attention from the viewpoints of the rationalization of the process, recycling and the like, and have been extensively used in fields, such as parts for automobiles, parts for domestic electric appliances, parts for medical equipment, electric wires, sundries, civil engineering sheets, building materials and the like. Among others, olefin thermoplastic elastomers comprising mixtures of crystalline propylene polymer resin with an olefin copolymer rubber, such as an ethylene/propylene copolymer rubber or an ethylene/propylene/non-conjugated diene copolymer rubber, are relatively inexpensive and hence have drawn attention as cost-effective materials.

This type of olefin thermoplastic elastomers, however, because they are in the form of a mixture, are likely to cause coarse dispersion or heterogeneous dispersion of the rubber. Therefore, as compared with other thermoplastic elastomers or conventional vulcanized rubber, they are inferior in balance between softness and tensile properties, such as tensile breaking strength and elongation, and balance between softness and low-temperature impact resistance, and, for example, involve a problem that, on substantially the same level of softness, they are inferior in tensile properties and low-temperature impact resistance. In addition, the above type of olefin thermoplastic elastomers have unsatisfactory heat resistance.

In order to solve these problems, processes for producing a composition comprising a crystalline propylene polymer resin and an ethylene/propylene copolymer rubber by polymerization have been proposed. For example, Japanese Patent Laid-Open Publication No. 2054139/1991 discloses an elastoplastic polypropylene composition, produced by successive polymerization, comprising: (A) 10 to 60 parts by weight of a crystalline homopolymer or copolymer of propylene; (B) 10 to 40 parts by weight of a crystalline propylene/ethylene copolymer component insoluble in xylene at room temperature; and (C) 30 to 60 parts by weight of a noncrystalline propylene/ethylene copolymer component soluble in xylene at room temperature and having an ethylene content of 40 to 70% by weight, and Japanese Patent Laid-Open Publication No. 25367/1994 discloses an elastoplastic polypropylene composition, produced by successive polymerization, comprising: (A) 10 to 50 parts by weight of a crystalline homopolymer or copolymer of propylene; (B) 5 to 20 parts by weight of a crystalline propylene/ethylene copolymer component insoluble in xylene at room temperature; and (C) 40 to 80 parts by weight of a noncrystalline propylene/ethylene copolymer component soluble in xylene at room temperature and having an ethylene content of less than 40% by weight.

According to studies conducted by the present inventors, however, although the former composition has excellent balance between softness and low-temperature impact resistance, the balance between softness and tensile properties is poor, while the latter composition has excellent balance between softness and tensile properties, but is poor in balance between softness and low-temperature impact resistance. That is, it has been found that, in both compositions, a simultaneous improvement in balance between softness and tensile properties and balance between softness and low-temperature impact resistance could have not been achieved, and, in addition, the heat resistance is still unsatisfactory.

DISCLOSURE OF THE INVENTION

In view of the above prior art, the present invention has been made. Accordingly, it is an object of the present invention to provide an olefin thermoplastic elastomer composition which has excellent balance between softness and tensile properties and balance between softness and low-temperature impact resistance and, at the same time, has excellent heat resistance, and a process for producing the same.

According to one aspect of the present invention, there is provided an olefin thermoplastic elastomer composition comprising the following components (A) and (B), said composition having been produced by first polymerizing a monomer of the component (A) and then polymerizing monomers of the component (B), said composition having such fractionation properties that, in temperature rising elution fractionation in the temperature range of 0 to 140° C. using o-dichlorobenzene as a solvent, the eluate obtained at 0° C. is 35 to 60% by weight based on the total elution weight and the eluate obtained at 80 to 100° C. is 1 to 5% by weight based on the total elution weight:

(A) 30 to 60% by weight, based on the whole composition, of a propylene homopolymer component having an isotactic index of not less than 90%; and (B) 40 to 70% by weight, based on the whole composition, of a copolymer of propylene with other α-olefin having 2 to 8 carbon atoms, said copolymer comprising propylene and ethylene as essential components.

According to another aspect of the present invention, there is provided a process for producing the above olefin thermoplastic elastomer composition, said process comprising subjecting a monomer of the component (A) and monomers of the component (B) to successive polymerization in the presence of a catalyst comprising an organoaluminum compound and a solid component, said solid component comprising a titanium atom, a magnesium atom, a halogen atom, and an electron-donating compound as essential components.

BEST MODE FOR CARRYING OUT THE INVENTION

The component (A) as one of the components constituting the olefin thermoplastic elastomer composition according to the present invention is a homopolymer of propylene having an isotactic index of not less than 90%, preferably an isotactic index of not less than 95%. When the isotactic index of the component (A) is less than 90% by weight, the composition as the thermoplastic elastomer has poor balance between softness and tensile properties and poor heat resistance.

The component (B) as the other component constituting the olefin thermoplastic elastomer composition according to the present invention is a copolymer of propylene with other α-olefin having 2 to 8 carbon atoms, the copolymer comprising propylene and ethylene as indispensable components (monomer units). Among others, a copolymer of propylene with ethylene is preferred as the component (B).

α-olefins having 4 to 8 carbon atoms usable herein include, for example, 1-butene, 3-methyl-1-butene, 1-pentene, 4-methyl-1-pentene, 1-hexene, and 1-octene.

Further, the component (B) may contain as a comonomer 0.5 to 10% by weight of a nonconjugated diene, such as 1,4-hexadiene, 5-methyl-1,5-hexadiene, 1,4-octadiene, cyclohexadiene, cyclooctadiene, dicyclopentadiene, 5-ethylidene-2-norbornene, 5-butylidene-2-norbornene, or 2-isopropenyl-5-norbornene.

The thermoplastic elastomer composition according to the present invention should be such that, in temperature rising elution fractionation in the temperature range of 0 to 140° C. using o-dichlorobenzene as a solvent, the eluate obtained at 0° C. is 35 to 60% by weight based on the total elution weight and the eluate obtained at 80 to 100° C. is 1 to 5% by weight based on the total elution weight.

When the eluate obtained at 0° C. in the composition is less than the lower limit of the above range and when the eluate obtained at 80 to 100° C. exceeds the upper limit of the above range, the composition as the thermoplastic elastomer has poor balance between softness and tensile properties. On the other hand, when the eluate obtained at 0° C. in the composition is more than the upper limit of the above range and when the eluate obtained at 80 to 100° C. is less than the lower limit of the above range, the moldability is poor.

The eluate obtained at 120 to 130° C. in the temperature rising elution fractionation is preferably 3 to 6% by weight based on the total elution weight from the viewpoint of the heat resistance of the thermoplastic elastomer composition.

The temperature rising elution fractionation (TREF) is a conventional analytical method. In principle, a polymer is fully dissolved in a solvent at a high temperature, and the solution is then cooled to form a thin polymer layer on the surface of an inert carrier contained in the solution. At that time, the polymer layer is formed in the order of crystallizability, that is, from a high crystalline component having high crystallizability to low crystalline component having low crystallizability or a noncrystalline component. Next, the temperature is raised in a continuous or stepwise manner. In this case, reversely to the above case, the low crystalline or noncrystalline component is first eluted, and the high crystalline component is lastly eluted. The composition distribution of the polymer is analyzed from an elution curve plotted from the elution amount at each temperature and the elution temperature.

In the present invention, o-dichlorobenzene is used as the solvent in the temperature rising elution fractionation.

The olefin thermoplastic elastomer composition according to the present invention comprises 30 to 60% by weight of the component (A) and 40 to 70% by weight of the component (B).

When the content of the component (A) is less than the lower limit of the above range and the content of the component (B) exceeds the upper limit of the above range, the composition as the thermoplastic elastomer has poor balance between softness and tensile properties and, at the same time, has poor heat resistance. On the other hand, when the content of the component (A) exceeds the upper limit of the above range with the content of the component (B) being less than the lower limit of the above range, it is difficult to provide a soft composition and, in addition, the balance between softness and low-temperature impact resistance is poor.

From the viewpoints of balance between softness and moldability and balance between softness and tensile properties of the composition as the thermoplastic elastomer, the weight average molecular weight as measured by gel permeation chromatography is preferably 100000 to 300000 for the component (A) and 200000 to 80000 for xylene solubles at room temperature in the whole composition.

Further, the content of the α-olefin other than propylene in xylene solubles at room temperature in the component (B) is preferably not less than 40% by weight from the viewpoint of low-temperature impact resistance.

The olefin thermoplastic elastomer composition according to the present invention comprises a composition produced by first polymerizing a monomer of the component (A) and then polymerizing monomers of the component (B). The catalyst used in this successive polymerization preferably comprises an organoaluminum compound and a solid component, the solid component comprising a titanium atom, a magnesium atom, a halogen atom, and an electron-donating compound as indispensable components.

Examples of organoaluminum compounds usable herein include compounds, known in this type of polymerization, represented by formula $R^1{}_m AlX_{3-m}$ wherein $R^1$ represents a hydrocarbon group having 1 to 12 carbon atoms, X represents a halogen atom, and m is a number of 1 to 3, for example, trialkylaluminums such as trimethylaluminum and triethylaluminum, dialkylaluminum halides, such as dimethylaluminum chloride and diethylaluminum chloride, alkylaluminum sesquihalides, such as methylaluminum sesquichloride and ethylalumintim sesquichloride, alkylaluminum dihalides, such as methylaluminum dichloride and ethylaluminum dichloride, and alkylaluminum hydride, such as diethylaluminum hydride.

Examples of solid components comprising a titanium atom, a magnesium atom, a halogen atom, and an electron-donating compound as indispensable components include compounds, here again known in this type of polymerization. Specifically, examples of titanium compounds as a source of the titanium atom include those represented by formula $Ti(OR^2)_{4-n}X_n$ wherein $R^2$ represents a hydrocarbon residue having 1 to 10 carbon atoms, X represents a halogen atom, and n is a number of 0 to 4. Among them, titanium tetrachloride, tetraethoxytitanium, tetrabutoxytitanium and the like are preferred. Magnesium compounds as a source of the magnesium atom include, for example, dialkylmagnesiums, magnesium dihalides, dialkoxymagnesium, and alkoxymagnesium halides. Among them, magnesium dihalides and the like are preferred. Halogen atoms usable herein include fluorine, chlorine, bromine, and iodine. Among them, chlorine is preferred. They are usually fed from the titanium compound or the magnesium compound. Further, they may also be fed from other halogen sources, such as halides of aluminum, halides of silicon, and halides of tungsten.

Electron-donating compounds usable herein include: oxygen-containing compounds, such as alcohols, phenols, ketones, aldehydes, carboxylic acids, organic acids or inorganic acids and derivatives of the above compounds; and nitrogen-containing compounds, such as ammonia, amines, nitriles, and isocyanates. Among them, inorganic acid esters, organic acid esters, organic acid halides and the like are preferred. More preferred are silicic esters, phthalic esters, cellosolve acetate, phthalic acid halides and the like, and particularly preferred are organosilicon compounds represented by formula $R^3 R^4{}_{3-p} Si(OR^5)_p$ wherein $R^3$ represents a branched aliphatic hydrocarbon residue having 3 to 20 carbon atoms, preferably 4 to 10 carbon atoms or a cyclic aliphatic hydrocarbon residue having 5 to 20 carbon atoms, preferably 6 to 10 carbon atoms; $R^4$ represents a branched or straight-chain aliphatic hydrocarbon residue having 1 to 20 carbon atoms, preferably 1 to 10 carbon atoms; $R^5$ represents an aliphatic hydrocarbon residue having 1 to 10 carbon atoms, preferably 1 to 4 carbon atoms; and p is a number of 1 to 3, for example, t-butyl-methyl -dimethoxysilane, t-butyl-methyl-diethoxysilane, cyclohexyl -methyl-dimethoxysilane, and cyclohexyl-methyl-diethoxy-silane.

In the process for producing an olefin thermoplastic elastomer composition according to the present invention, in the first step, propylene is fed, and homopolymerized in the presence of the catalyst described above under conditions of temperature 50 to 150° C., preferably 50 to 100° C., and partial pressure of propylene 0.5 to 4.5 MPa, preferably 1.0 to 3.5 MPa, to produce the component (A). Subsequently, in the second step, a combination of propylene with ethylene or a combination of propylene with ethylene and an α-olefin having 4 to 8 carbon atoms is fed, and copolymerization of propylene with ethylene or copolymerization of propylene with ethylene and α-olefin is carried out in the presence of the above catalyst under conditions of temperature 50 to 150° C., preferably 50 to 100° C., partial pressure of propylene and partial pressure of ethylene each 0.3 to 4.5 MPa, preferably 0.5 to 3.5 MPa, to produce the component (B).

The polymerization may be carried out on a batch, continuous, or semibatch basis. The first-stage polymerization is preferably carried out in a gaseous or liquid phase, particularly preferably in a gaseous phase. The second-stage polymerization is preferably carried out in a gaseous phase. In the polymerization in each stage, the residence time is generally 0.5 to 10 hr, preferably 1 to 5 hr.

In order to eliminate the tackiness and the like of powder particles of the composition produced by the above process and to impart the fluidity, after the polymerization of the monomer of the component (A) in the first step and before or during the polymerization of the monomers of the component (B) in the second step, a compound containing active hydrogen is preferably added in an amount of 100 to 1000 times, by mole, the amount of the titanium atom in the solid component in the catalyst and in an amount of 2 to 5 times, by mole, the amount of the organoaluminum compound in the catalyst.

Compounds containing active hydrogen usable herein include, for example, water, alcohols, phenols, aldehydes, carboxylic acids, acid amides, ammonia, and amines.

The olefin thermoplastic elastomer composition of the present invention producible by the above process has a melt flow rate of 0.1 to 5 g/10 min as measured under conditions of temperature 230° C. and load 21.18 N according to JIS K 7210, a density of about 0.87 to 0.88 g/cm³ as measured by the underwater substitution method according to JIS K 7112, a bending modulus of not more than 600 MPa as measured at a temperature of 23° C. according to JIS K 7203, a tensile breaking strength of not less than 6 MPa and a tensile breaking elongation of not less than 700% as measured at a temperature of 23° C. according to JIS K 7113, and an Izod impact strength of not less than 10 kJ/m² and particularly is not broken in an Izod impact test (temperature −40° C.) according to JIS K 7110.

The olefin thermoplastic elastomer composition according to the present invention comprises the components (A) and (B) as indispensable components. In general, the composition may be compounded with a rubber softener for imparting moldability, softness and the like to the thermoplastic elastomer.

Particularly preferred rubber softeners usable herein include mineral oil-based softeners which are generally a mixture of three types of hydrocarbons, aromatic hydrocarbons, naphthene hydrocarbons, and paraffin hydrocarbons. The mineral oil-based softener is classified into a paraffin mineral oil wherein not less than 50% of the total number of carbon atoms is accounted for by the number of carbon atoms of paraffin hydrocarbons, a naphthene mineral oil wherein 30 to 40% of the total number of carbon atoms is accounted for by the number of carbon atoms of naphthene hydrocarbons, and an aromatic mineral oil wherein not less than 30% of the total number of carbon atoms is accounted for by the number of carbon atoms of aromatic hydrocarbons. According to the present invention, the paraffin mineral oil is particularly preferred.

If necessary, the olefin thermoplastic elastomer composition according to the present invention may be compounded with various resins, fillers, such as rubber, glass fiber, calcium carbonate, silica, talc, mica, and clay, various additives, such as antioxidants, photostabilizers, antistatic agents, flame retardants, dispersants, nucleating agents, neutralizers, and slip agents, pigments, such as carbon black, and the like.

Further, mixing and kneading may be carried out in a melted state by means of a mixing-kneading device, such as a mixing roll, a kneader, a Banbury mixer, a Brabender plastograph, or a single screw or twin screw extruder, in the presence of a crosslinking agent, such as an organic peroxide, and a crosslinking aid to partially crosslink the component (B), thereby further improving the tensile strength. Alternatively, mixing and kneading may be carried out in a melted state by means of the above mixing-kneading device in the presence of an organic peroxide to regulate the melt flow properties, thereby controlling the moldability, while maintaining the balance between strength and low-temperature impact resistance.

The olefin thermoplastic elastomer composition according to the present invention may be molded by various molding methods conventionally applied to thermoplastic elastomers, such as extrusion molding, injection molding, and compression molding, into molded products having desired shapes in the form of a single material, a laminate of the material and other material and the Like.

EXAMPLES

The following examples further illustrate the present invention but are not intended to limit it unless they depart from the subject matter of the present invention.

Production examples of olefin thermoplastic elastomer compositions used in the examples and comparative examples will be described.

Production of Solid Component Catalyst

A tank having an internal volume of 50 liters and equipped with an agitator, in which the air had been replaced by nitrogen, was charged with 20 liters of dehydrated and deoxygenated n-heptane. 4 mol of magnesium chloride and 8 mol of tetrabutoxytitanium were introduced into the tank, and a reaction was allowed to proceed at 95° C. for 2 hr. The temperature was then decreased to 40° C. 480 ml of methylhydropolysiloxane (viscosity 20 cSt) was introduced into the system, and a reaction was allowed to proceed for additional 3 hr. The reaction solution was taken out of the tank, and the resultant solid component was washed with n-heptane.

Subsequently, the above tank equipped with an agitator was provided. 15 liters of dehydrated and deoxygenated n-heptane was introduced into the tank. Next, the solid component obtained above was introduced in an amount of 3 mol in terms of magnesium atom. A mixed solution prepared by adding 8 mol of silicon tetrachloride to 25 ml of n-heptane was introduced into the tank at 30° C. over a period of 30 min. The temperature was raised to 90° C., and a reaction was allowed to proceed for one hr. Thereafter, the reaction solution was taken out of the tank, and the resultant solid component was washed with n-heptane.

Subsequently, the above tank equipped with an agitator was provided, and 5 liters of dehydrated and deoxygenated n-heptane was introduced into the tank. 250 g of the titanium-containing solid component prepared above, 750 g of 1,5-hexadiene, 130 ml of t-butyl-methyl-dimethoxysilane, 10 ml of divinyldimethylsilane, and 225 g of triethylaluminum were then introduced into the tank, followed by a catalytic reaction at 30° C. for 2 hr. The reaction solution was taken out of the tank, and washed with n-heptane to obtain a solid component catalyst.

For the solid component catalyst thus obtained, the amount of a prepolymer of 1,5-hexadiene was 2.97 g per the titanium-containing solid component.

Production of Olefin Thermoplastic Elastomer Composition

At a temperature of 70° C., propylene in such an amount as will provide a pressure of about 3.2 MPa, triethylaluminum, and the solid component catalyst in such amount ratio as will provide a polymer production rate of 30 kg per hr were continuously fed into a first-stage reactor having an internal volume of 550 liters. Further, hydrogen as a molecular weight modifier was continuously fed while carrying out polymerization in a liquid phase (first-stage polymerization).

Subsequently, the polymer thus obtained was introduced through a propylene purge tank into a second-stage reactor having an internal volume of 1900 liters. Propylene and ethylene in such an amount ratio corresponding to the composition ratio of these monomers constituting the resultant copolymer were then continuously fed so as to provide a pressure of 3.0 MPa at a temperature of 60° C. Further, hydrogen as a molecular weight modifier was continuously fed, and, in addition, an active hydrogen compound was fed in an amount of 200 times, by mole, the amount of the titanium atom in the solid component catalyst fed in the first step and in an amount of 2.5 times, by mole, the amount of triethylaluminum to carry out polymerization in a gaseous phase. The resultant polymer was continuously transferred to a vessel, and a water-containing nitrogen gas was introduced into the vessel to terminate the reaction (second-stage polymerization).

Examples 1 to 4 and Comparative Examples 1 and 2

For compositions of examples and comparative examples produced by the process described in the production example, the percentage by weight of the component (A) based on the whole composition, the isotactic index of the component (A), the percentage by weight of the component (B) based on the whole composition, and, in temperature rising elution fractionation of the whole composition, the percentage by weight of the eluate at 0° C. based on the total elution weight, the percentage by weight of the eluate in the temperature range of 80 to 100° C. based on the total elution weight, and the percentage by weight of the eluate in the temperature range of 120 to 130° C. based on the total elution weight were measured by the following methods. The results are summarized in Table 1.

Percentage by Weight of Component (A) and Percentage by Weight of Component (B) Based on Whole Composition The percentage by weight of the component (B) based on the whole composition (hereinafter referred to as "B(%)") was calculated from the weight of the resultant polymer composition and the weight of propylene and ethylene fed in the second-step polymerization.

The percentage by weight of the component (A) based on the whole composition (hereinafter referred to as "A(%)") was calculated by "100−B."

Isotactic Index of Component (A)

Measured as a Soxhlet extraction residue using n-heptane.

Eluate in Temperature Rising Elution Fractionation

A cross fractionation device ("CFC T 150A," manufactured by Mitsubishi Chemical Corporation) comprising a temperature rising elution fractionation (TREF) mechanism for fractionation of a sample utilizing the difference in dissolution temperature, connected on an online basis to a size exclusion chromatography (SEC) for further fractionating fractions according to molecular sizes was used as a measuring device.

o-Dichlorobenzene was provided as a solvent. The polymer was dissolved in the solvent at 140° C. to a concentration of 4 mg/ml. The solution was injected into a sample loop in the measuring device. The sample solution within the sample loop was injected into a stainless steel column (4 mm in inner diameter×150 mm in length), attached to the TREF device, packed with glass beads as an inert carrier. The temperature was cooled from 140° C. to 0° C. at a temperature fall rate of 1° C./min to coat the sample solution onto the surface of the inert carrier. This column was kept at 0° C. for 30 min. Thereafter, 2 ml of the component dissolved at a temperature of 0° C. was injected at a flow rate of 1 ml/min from the TREF column into an SEC column ("AD80M/S," manufactured by Showa Denko K. K.; three columns). During molecular size fractionation in SEC, the temperature of the TREF column was raised to the next elution temperature (5° C.). The temperature was kept at that temperature for 30 min, followed by injection into the SEC column. The above procedure was repeated. The eluate portions in SEC were measured at intervals of 39 min. The elution temperatures were 0° C., 5° C., 10° C., 15° C., 20° C., 25° C., 30° C., 35° C., 40° C., 45° C. 49° C., 52° C., 55° C., 58° C., 61° C., 64° C., 67° C., 70° C., 73° C., 76° C., 79° C., 82° C, 85° C., 88° C., 91° C., 94° C., 97° C., 100° C., 102° C., 120° C, and 140° C., as increased stepwise.

For solutions fractionated according to molecular sizes in the SEC column, the absorbance proportional to the polymer concentration was measured with an infrared spectrophotometer attached to the device (detected by stretching vibration of methylene at a wavelength of 3.42 μm) to obtain chromatograms for the elution temperature portions. A base line was drawn using a built-in data processing software on the chromatograms for the elution temperature portions, followed by arithmetic processing. The area of each chromatogram was integrated to calculate an integral elution curve. The integral elution curve is differentiated by the temperature to calculate a differential elution curve. A diagram as the calculation results was output from a printer. The output diagram of the differential elution curve was such that the elution temperature was drawn as abscissa in a size of 89.3 mm per 100° C., while differential amount (the total integral elution amount was normalized as 1.0, and the amount of change in 1° C. was regarded as the differential amount) was drawn as ordinate in a size of 76.5 mm per 0.1 of the differential amount.

Content of Ethylene in Xylene Solubles at Room Temperature in Component (B)

The resultant polymer after the first-stage polymerization was sampled, and 1 g of the sample was placed in 300 ml of xylene in an oil bath, and dissolved with stirring at the boiling point of xylene, 140° C. After the elapse of one hr, the temperature was decreased to 100° C. within one hr while continuing the stirring. The solution was then transferred to an oil bath for rapid cooling, and rapidly cooled to 23±2° C., while continuing stirring, to precipitate polymer, and the system was allowed to stand for 20 min or more. The precipitate was spontaneously filtered through a filter paper. The filtrate was evaporated to dryness by means of an evaporator, dried at 120° C. for 2 hr under reduced pressure, and allowed to cool to room temperature. The weight was measured, and the percentage by weight of xylene solubles, at room temperature in the component (A), based on the amount of the component (A) (hereinafter referred to as "aCXS(%)") was calculated.

Likewise, the percentage by weight of xylene solubles at room temperature in the polymer composition produced (hereinafter referred to as "ACXS+BCXS (%)") was determined.

The percentage by weight of xylene solubles at room temperature in the component (A) based on the whole composition (hereinafter referred to as "ACXS (%)") was calculated by "aCXS×A/100," and the percentage by weight of xylene solubles at room temperature in the component (B) (hereinafter referred to as "BCXS (%)") was calculated by "(ACXS+BCXS)−ACXS."

The content of ethylene in xylene solubles at room temperature in the polymer composition produced (hereinafter referred to as "ECXS(%)") was measured by infrared spectrophotometry, and the content of ethylene in xylene solubles at room temperature in the component (B) was calculated by the following equation.

Ethylene content=$ECXS/[BCXS/(ACXS+BCXS)]$

Weight Average Molecular Weight of Xylene Solubles at Room Temperature in Component (A) and Whole Composition The resultant polymer after the first-stage polymerization [component (A)] was sampled. Further, after the second-stage polymerization, the above procedure was carried out to sample xylene solubles at room temperature in the resultant polymer composition. For these samples, the weight average molecular weight was measured by gel permeation chromatography using polystyrene as a standard substance in o-dichlorobenzene at 140° C.

For the composition thus obtained, the melt flow rate, density and thermal properties were measured by the following methods. The results are summarized in Table 1.

Melt Flow Rate

Measured under conditions of temperature of 230° C. and load 21.18 N according to JIS K 7210.

Density

Measured by the underwater substitution method according to JIS K 7112.

Thermal Properties

The melt peak temperature was measured with a differential scanning calorimeter (DSC, manufactured by Seiko Instruments Inc.) at a temperature rise rate of 10° C./min according to JIS K 7121.

To powder particles of the olefin plastic elastomer composition were added 0.05 part by weight, based on 100 parts by weight of the elastomer composition, of tetrakis [methylene-3-(3', 5'-di-t-butyl-4'-hydroxyphenyl) propionate]methane ("IRGANOX 1010," manufactured by Chiba Geigy Limited, Japan) and tris(2,4-di-t-butylphenyl) phosphite ("IRGAFOS 168," manufactured by Chiba Geigy Limited, Japan) as antioxidants and 0.05 part by weight, based on 100 parts by weight of the elastomer composition, of zinc stearate as a neutralizer. The mixture was melt-kneaded by means of a twin screw extruder having a cylinder diameter of 45 mm ("PCM45," manufactured by Ikegai Corp.) set at a temperature of 200° C., followed by pelletization. The pellet was injection molded into a test piece sample by means of an injection molding machine ("N-100," manufactured by The Japan Steel Works, Ltd.) with a clamping pressure of 100 t under conditions of temperature at a portion below a hopper 175° C., cylinder temperature 220° C., nozzle temperature 210° C., and mold temperature 40° C. Hardness, bending modulus, tensile properties, and impact strength measurements were made on the sample by the following methods. The results are summarized in Table 1.

Hardness

Measured in terms of durometer hardness of type D according to JIS K 7215.

Bending Modulus

Measured at a temperature of 23° C. according to JIS K 7203.

Tensile Properties

Tensile yield strength, tensile breaking strength, and tensile breaking elongation were measured using a No. 2 type test piece under conditions of temperature 23° C. and tensile speed 50 mm/min according to JIS K 7113.

Impact Strength

Measured in terms of notched Izod impact strength at a temperature of −40° C. according to JIS K 7110.

As is apparent from the results shown in Table 1, the present invention can provide an olefin thermoplastic elastomer composition which has excellent balance between softness and tensile properties and balance between softness and low-temperature impact resistance and, at the same 8time, has excellent heat resistance, and a process for producing the same.

TABLE 1

|  | Ex. 1 | Ex. 2 | Ex. 3 | Ex. 4 | Ex. 5 | Ex. 6 | Comp. Ex. 1 | Comp. Ex. 2 |
|---|---|---|---|---|---|---|---|---|
| Component (A), wt % | 51.1 | 48.5 | 45.2 | 44.0 | 39.5 | 43.6 | 33.9 | 43.8 |
| Isotactic index, % | 98.1 | 98.2 | 98.1 | 98.7 | 98.1 | 98.3 | Not measured | Not measured |
| Weight average molecular weight, × 10000 | 23.1 | 23.3 | 23.1 | 25.0 | 20.9 | 19.9 | 33.3 | 24.0 |
| Component (B), wt % | 48.9 | 51.5 | 54.8 | 56.0 | 60.5 | 56.4 | 66.1 | 56.2 |
| Content of ethylene in xylene solubles at room temp. in component (B), wt % | 40.6 | 42.9 | 51.2 | 44.1 | 41.4 | 23.8 | 49.3 | 45.2 |
| Weight average molecular weight of xylene solubles at room temp. in (A) + (B), × 10000 | 48.6 | 27.2 | 28.4 | 68.4 | 56.1 | 30.3 | 24.0 | 36.3 |
| Temp. rising elution fractionation of (A) + (B): |  |  |  |  |  |  |  |  |
| Eluate at 0° C., wt % | 40.2 | 43.2 | 45.2 | 47.3 | 51.2 | 40.0 | 35.7 | 36.6 |
| Eluate at 80 to 100° C., wt % | 3.4 | 1.7 | 2.1 | 4.2 | 3.3 | 2.3 | 8.9 | 7.4 |
| Eluate at 120 to 130° C., wt % | 3.6 | 5.3 | 4.6 | 4.1 | 3.8 | 3.7 | 0 | 0.9 |
| Melt flow rate, g/10 min | 0.6 | 1.5 | 1.2 | 0.3 | 0.3 | 2.1 | 0.9 | 2.5 |
| Density, g/cm$^3$ | 0.8828 | 0.8801 | 0.8790 | 0.8790 | 0.8800 | 0.8820 | 0.8830 | 0.8841 |
| Melting peak temp. in DSC, ° C. | 164.3 | 163.8 | 164.3 | 164.3 | 164.3 | 164.3 | 159.9 | 159.4 |
| Hardness (durometer D) | 55 | 53 | 51 | 54 | 53 | 54 | 50 | 53 |
| Bending modulus, MPa | 355 | 356 | 323 | 307 | 255 | 347 | 267 | 331 |
| Tensile yield stress, MPa | 9.5 | 9.9 | 8.5 | 8.7 | 7.4 | 10.1 | 6.7 | 8.3 |
| Tensile breaking stress, MPa | 16.1 | 17.8 | 13.0 | 15.5 | 13.5 | 20.3 | 9.7 | 9.6 |
| Tensile breaking elongation, MPa | 800 | 810 | 760 | 785 | 840 | 870 | 680 | 620 |
| Impact strength (−40° C.), kJ/m$^2$ | NB | NB | NB | NB | NB | 11.7 | NB | NB |

Note: "NB" represents that breaking did not occur.

What is claimed is:

1. An olefin thermoplastic elastomer composition consisting essentially of the following components (A) and (B), said composition obtainable by first polymerizing a monomer of the component (A) and then polymerizing monomers of the component (B), said composition having such fractionation properties that, in temperature rising elution fractionation in the temperature range of 0 to 140° C. using o-diclilorobenzene as a solvent, the eluate obtained at 0° C. is 35 to 60% by weight based on the total elution weight and the eluate obtained at 80 to 100° C. is 1 to 5% by weight based on the total elution weight:

(A) 30 to 60% by weight, based on the whole composition, of a propylene homopolymer component having an isotactic index of not less than 90%; and (B) 40 to 70% by weight, based on the whole composition, of a copolymer of propylene with other α-olefin having 2 to 8 carbon atoms, said copolymer comprising propylene and ethylene, wherein the content of α-olefin other than propylene in xylene solubles at room temperature in the component (B) is not less than 40% by weight.

2. The olefin thermoplastic elastomer composition according to claim 1, wherein the eluate obtained at 120 to 130° C. in the temperature rising elution fractionation is 3 to 6% by weight based on the total elution weight.

3. The olefin thermoplastic elastomer composition according to claim 1 or 2, wherein the component (A) has a weight average molecular weight of 100000 to 300000 and the weight average molecular weight of xylene solubles at room temperature in the whole composition is 200000 to 800000.

4. The olefin thermoplastic elastomer composition according to claim 1, wherein the component (B) is a copolymer of propylene with ethylene.

5. A process for producing an olefin thermoplastic elastomer composition consisting essentially of the following components (A) and (B), said composition obtainable by first polymerizing a monomer of the component (A) and then polymerizing monomers of the component (B), said composition having Such fractionation properties that, in temperature rising elution fractionation in the temperature range of 0 to 140° C. using o-dichlorobenzene as a solvent, the eluate obtained at 0° C. is 35 to 60% by weight based on the total elution weight and the eluate obtained at 80 to 100° C. is 1 to 5% by weight based on the total elution weight:

(A) 30 to 60% by weight, based on the whole composition, of a propylene homopolymer having an isotactic index of not less than 90%; and (B) 40 to 70% by weight, based on the whole composition, of a copolymer of propylene with other α-olefin having 2 to 8 carbon atoms, said copolymer comprising propylene and ethylene, said process comprising the steps of:
polymerizing a monomer of the component (A) in the presence of a catalyst comprising an organoaluminum compound and a solid component, said solid component comprising a titanium atom, a magnesium atom, a halogen atom, and an electron-donating compound; and
then polymerizing monomers of the component (B) in the presence of said catalyst.

6. The process according to claim 5, wherein, after the polymerization of the monomer of the component (A) and before or during the polymerization of the monomers of the component (B), a compound containing active hydrogen is added in an amount of 100 to 1000 times, by mole, the amount of the titanium atom in the solid component in the catalyst and in an amount of 2 to 5 times, by mole, the amount of the organoaluminum compound in the catalyst.

7. The process according to claim 5 or 6, wherein the polymerization of the monomer of the component (A) is carried out in a gaseous phase or a liquid phase and the polymerization of the monomers of the component (B) is carried out in a gaseous phase.

* * * * *